Aug. 20, 1968  F. A. MARINACCIO  3,397,704
FILTERING DEVICE
Filed May 14, 1965
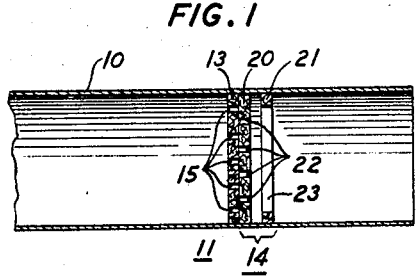
FIG. 1
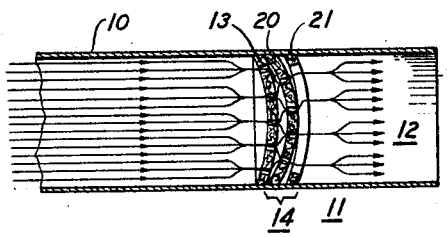
FIG. 2
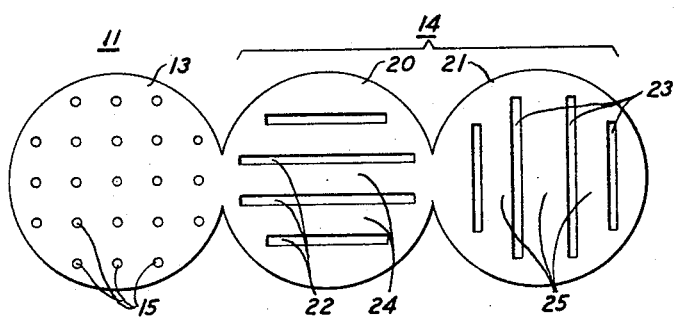
FIG. 3
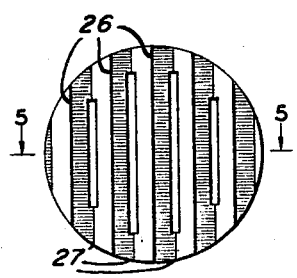
FIG. 4
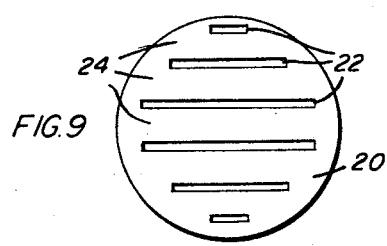
FIG. 9 / FIG. 10
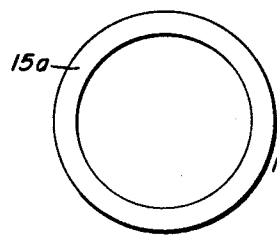
FIG. 5
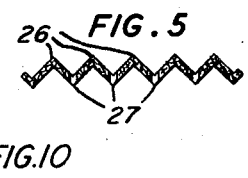
FIG. 6
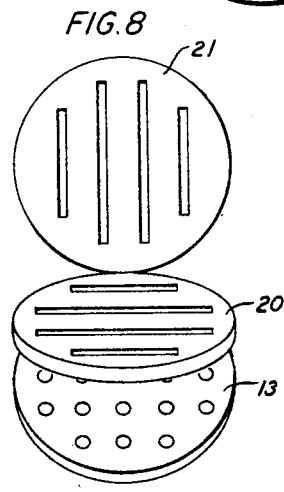
FIG. 8
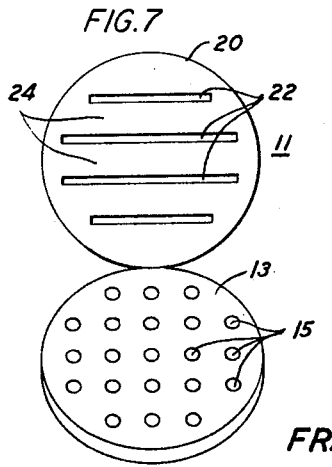
FIG. 7
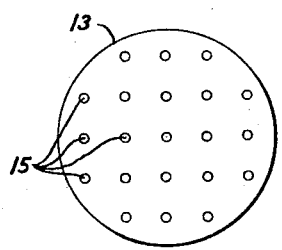
INVENTOR
FRANK A. MARINACCIO
BY
ATTORNEY

United States Patent Office 3,397,704
Patented Aug. 20, 1968

3,397,704
FILTERING DEVICE
Frank A. Marinaccio, Clark Road,
Bernardsville, N.J. 07924
Filed May 14, 1965, Ser. No. 455,722
13 Claims. (Cl. 131—261)

ABSTRACT OF THE DISCLOSURE

In this filter, an accelerating member is combined with a diverting member. The accelerating member is perforated with a number of holes or orifices, while the diverting member includes at least one flexible member perforated with a number of expandable slits.

This invention pertains to filtering devices and relates specifically to those which are used to filter gaseous mediums. Broadly, the object of this invention is to remove particulate matter from such mediums.

Many kinds of filters are available for use in filtering gases. Each, moveover, uses one or another of several filtering principles. In one type, for example, a medium such as gas or smoke is passed through a mass or maze of fibrous material and the particulate matter contained therein is removed by sticking as it brushes against the filter fibers.

In another type, a particle-laden medium is passed through one or more orifices. The orifices accelerate the medium and then direct it against an impervious plate or wall. The accelerated medium, unable to pass through the plate or wall, changes the direction of its flow. Particulate matter accelerated with the medium, however, is unable to readily change direction and, as a result, splatters against the plate or wall and is thereby removed.

This invention is directed specifically to filters of the latter or accelerated type. Accelerating type filters have received some commercial acceptance but they are generally cumbersome, complicated, inefficient, and relatively expensive to make.

It is, therefore, one object of this invention to improve filters wherein filtering is achieved by accelerating and diverting a medium which carries material to be filtered out.

Filters of the type described have particular application to cigarettes, cigars, and other tobacco products. In such smoke-producing products, it is generally desirable to filter out the tars, nicotine, and other combustion by-products before the tobacco smoke reaches the smoker's mouth. A smoker's enjoyment, however, is impaired if the filtering action results in a hard drawing product.

Accordingly, it is another object of this invention to filter particulate matter from a gaseous medium such as tobacco smoke while imposing the least possible burden on the flow thereof.

In accordance with one feature of this invention, an accelerating member and a diverting member are combined in a filter in such a manner that the two members will be situated one behind the other when the filter is placed in the path of a gaseous medium to be filtered. Both members face each other in close proximity and the accelerating member includes a plurality of orifices for accelerating the medium, while the diverting member includes a plurality of expandable apertures for diverting the flow of the accelerated medium from one direction to another.

According to another feature of this invention, the orifices in the accelerating member are arranged in parallel rows and the apertures in the diverting member comprise slits arranged in parallel rows which are interspersed between the orifice rows whereby a gaseous medium passing through the orifices must negotiate a change of direction in order to enter the apertures.

According to another feature of this invention, the apertures in the diverting member expand in response to pressure exerted by the accelerating medium whereby the medium passing therethrough encounters a reduced amount of flow resistance.

According to another feature of this invention, the diverting member is pleated to form hills and valleys and the slits therein are cut through the valleys.

According to still another feature of this invention, the diverting member comprises a series of individually slitted parts disposed one after the other in a row wherein the slits in adjacent parts are not coextensive.

Other objects and features of this invention will become apparent from the following detailed specification when taken in conjunction with the drawing in which:

FIG. 1 is a partial section view of a tube which contains a filter;

FIG. 2 is a partial section view of the tube and filter shown in FIG. 1 as it appears when a gaseous medium is flowing therethrough under pressure;

FIG. 3 is a front elevation view of a filter containing an accelerating member and a diverting member made up of front and rear parts;

FIG. 4 is a front elevation view of a pleated part for use in a diverting member;

FIG. 5 is a section view of the part shown in FIG. 4 taken along the line 5—5;

FIG. 6 is a front elevation view of a filter showing an accelerating member;

FIG. 7 is a front elevation view of a filter with the accelerating member peeled away to expose a front part of the diverting member;

FIG. 8 is a front elevation view with the accelerating member and the front part of a diverting member peeled away to show a rear part of the diverting member.

FIG. 9 is a possible alternate form of the front part of the diverting member showing an increase in the number of slits; and FIG. 10 is a plan view of a washer.

Referring now to FIG 1, a tube 10 containing a filter 11 is shown. The tube 10 carries gas, smoke or, a similar medium which contains material of a particulate nature. For the purposes of illustration, the medium flowing in the tube 10 in FIG. 2 is represented by the arrows 12. For convenience, however, the arrows 12 hereinafter will be referred to as the medium 12.

The filter 11 is positioned in the tube 10 so that the medium 12 flowing in the tube 10 will pass therethrough. The filter 11 comprises two parts, viz., an accelerating member 13 and a diverting member 14. The accelerating member 13 intercepts and increases the velocity of the medium 12 as it flows through the tube 10 while the diverting member 14 changes the direction of the medium 12 after its velocity has been increased by the accelerating member 13. Thus, as shown in FIGS. 1 and 2, the accelerating member 13 and the diverting member 14 are placed one behind the other in the tube 10 with the accelerating member 13 upstream of the diverting member 14.

The accelerating member 13 is made of a material which is substantially impervious to the particular medium sought to be filtered. For example, where the tube 10 is a cigarette and the medium is tobacco smoke, the accelerating member 13 can be advantageously made from a wet strength paper such as that which is used for setting hair in the cosmetics industry.

No matter what the material from which it is made, the accelertaing member 13 includes a plurality of orifices 15. As shown in FIG. 3, the orifices 15 are advantageously arranged in parallel rows. The orifices 15 can be made in any convenient manner, but those made by perforating the accelerating member 13 with a sharply pointed or spear-like tool are particularly advantageous for reasons which will be explained hereinafter.

The diverting member 14 comprises one or more flexible parts. As shown in FIG. 3, the diverting member 14 includes a flexible front part 20 and a flexible rear part 21. As in the case of the accelerating member 13, the parts of the diverting member 14 are made of a material which is generally impervious to the particular medium to be filtered in the tube 10. Again, as in the case of the accelerating member 13 where the tube 10 is a cigarette and the medium 12 is tobacco smoke, the parts 20 and 21 may conveniently be made of a wet strength paper.

In the embodiment illustrated in FIG. 3, the filter 11 and its components are not shown in the installed condition, rather they are shown as they appear during manufacture. As illustrated, the entire filter 11 has been cut from a single piece of filter material in a process which has left all of the components joined together. In the next step, when the filter 11 is being prepared for installation into the tube 10, the elements will be folded until the filter takes the form shown in FIGS. 1 and 2.

Returning now to the description of the diverting member 14, each part therein includes a plurality of apertures. For example, as shown in FIG. 3, the front part 20 includes a plurality of apertures 22 and the rear part 21 includes a plurality of apertures 23. The number of apertures in each part, however, need not be the same. Preferably, all of the apertures in each part are disposed in parallel rows. In one advantageous form, as shown in FIG. 9, the front part 20 contains more apertures than the rear part 21.

When the apertures in the parts are arranged in parallel rows, they divide the parts into a plurality of flexible portions. As shown in FIG. 3, for example, the apertures 22 divide the front part 20 into a plurality of flexible portions 24 while the apertures 23 divide the rear part 21 into a plurality of flexible portions 25.

Each aperture in the various parts of the diverting member 14 is advantageously very narrow. For example, where the tube 10 is a cigarette, the apertures are slits which have been made in the parts with a cutter such as a razor blade.

When the accelerating member 13 and the diverting member 14 are assembled into the filter 11, they face each other in close proximity. For example, as shown in FIG. 1, the front part 20 of the diverting member 14 appears to lie flat against the accelerating member 13. However, the orifices 15 in the embodiment of the accelerating member 13 illustrated have been perforated with a pointed tool. By perforating the orifices 15 with a pointed tool, an annular ridge of protruded material (not shown) is formed around each orifice. Thus, when the front part 20 is positioned in the filter 11, it is spaced from the accelerating member 13 by the annular ridges around the orifices 15. When the orifices 15 are formed in ways which do not form such ridges, washers 15a can be used. As shown in FIG. 10, the washers 15a advantageously have the same outside diameter as the front part 20. The center, moreover, should be removed over an area sufficiently large to permit an unobstructed passage between the orifices 15 and diverting member 14.

As heretofore described, the filter 11 comprises, in one form, an accelerating member 13 and a diverting member 14 made up of two parts such as the front part 20 and the rear part 21. The embodiment disclosed in FIGS. 6, 7, and 8 illustrates an advantageous arrangement of these elements. For example, in FIG. 6 an upstream view of the filter 11 shows the accelerating member 13 perforated with a plurality of orifices 15 arranged in parallel rows.

It is to be noted, however, that the components shown in FIG. 6, as well as in FIGS. 7 and 8, are a variation of the arrangement shown in FIG. 3. Specifically, FIG. 3 shows all of the components attached to each other while in FIGS. 6, 7 and 8 the components have been separated from each other and then arranged one behind the other.

In FIG. 7, the accelerating member 13 has been peeled away to expose the front part 20 in the diverting member 14. In the embodiment shown, the apertures 22 in the front part 20 are spaced in parallel rows wherein each row is disposed so as to be between two rows of orifices 15 in the assembled filter.

Finally, in FIG. 8, the accelerating member 13 and the front part 20 of the diverting member 14 are peeled away to expose the rear part 21. In the embodiment shown, the apertures 23 in the rear part 21 are spaced in parallel rows with each row disposed so as to be substantially perpendicular to the rows of apertures in the front part 20 and interspersed between two rows of orifices 15 in the assembled filter.

In operation, the particulate-laden medium 12 is drawn through the tube 10 toward the filter 11. When it reaches the filter 11, the medium 12 is blocked by the accelerating member 13. As a result, a pressure build-up occurs which forces the medium 12 through the orifices 15. Thus, the orifices 15 act as venturi which utilize a pressure differential established between the two faces of the accelerating member 13 to accelerate the medium 12.

The accelerated medium 12, as it leaves the orifices 15, impinges on the flexible portions 24 in the front part 20. Unable to penetrate the flexible portions 24, the medium 12 changes its direction of flow and enters the apertures 22.

As it impinges on the flexible portions 24, the medium 12 exerts a pressure which expands the apertures 22. As the apertures 22 expand, the medium 12 readily escapes from between the accelerating member 13 and the front part 20. It is supposed, therefore, that back pressure which the impinging medium 12 tends to build up is thereby relieved. Thus, the expansion of the apertures 22 maintains the pressure differential which exists across the venturi in the accelerating member 13. At the same time, moreover, the expansion of the apertures 22 permits free flow of the medium 12. Thus, only a limited burden is imposed on the free flow of the medium 12 as it passes through the accelerating member 13 and into the diverting member 14.

Filtering occurs, it is theorized, as the medium 12 changes direction. Specifically, it is though that the particulate matter in the medium 12 is unable to negotiate the change of direction made by the medium 12 as it passes out of the orifices 15 and into the apertures 22. It appears that the particulate matter separates from the medium 12 by splattering on the front part 20. In any event, the filter 11 has been tested in cigarettes and it has been observed that solid material accumulates on the flexible parts 24 and around the apertures 22 in the front part 20 when the cigarettes are smoked.

In the preceding description of operation, the diverting member 14 did not include a rear part 21; rather it consisted of only a front part 20. Such two-element filters are quite satisfactory. In fact, where only two elements are used, the front part 20 may advantageously be made in a different form. For example, as shown in FIG. 4, it may be pleated. In the pleated form, hills 26 and valleys 27 are formed wherein the ridges of the hills 26 are designed to abut the accelerating member 13 and the apertures 23, as shown in FIG. 5, are cut through valleys 27. The pleated form, especially, and other forms to a lesser extent, may advantageously be made from a metal foil.

From all of the foregoing, therefore, it is readily apparent that an efficient, serviceable filter is obtained when the diverting member 14 includes only a front part 20. Further advantages, however, accrue when a back part 21 is used in conjunction with the front part 20.

When entering the filter 11, the medium 12, in the manner previously explained, impinges on the front part 20, thereby causing the flexible parts 24 to deflect and the apertures 22 to expand. The amount by which the flexible portions 24 deflect, however, should not be excessive. Therefore, the flexible portions 25 in the rear part 21 are used to regulate the deflection of the flexible portions 24.

In the embodiment hereinbefore described, the apertures in the rear part 21 are fewer and farther apart than those in the front part 20. Thus, the flexible portions 25 in the rear part 21 are stiffer than the flexible portions in the front part 20. Moreover, as hereinbefore described, the rear part 21 is disposed with the apertures therein out of alignment with the apertures in the front part 20.

As illustrated in FIG. 1, the rear part 21 is spaced in close proximity to the front part 20. Thus, when the flexible portions 24 bend, they encounter the flexible portions 25. As a result, the flexible portions 25 limit the travel of the flexible portions 24 thereby regulating the amount they can deflect.

It is also thought that the apertures in the rear part 21 assist in the filtering action in a manner similar to that of the apertures in the front part 20. Cigarette tests with a filter equipped wih a rear part 21 produced deposits around the apertures 23 as well as the deposits accumulated on the front part 20.

From all of the foregoing, therefore, it is readily apparent that there has been described herein a filtering device which removes particulate matter from smoke, gas, or other medium by accelerating and deflecting the smoke, gas, or other medium while imposing only a limited burden on the free flow thereof. It is to be understood, however, that the embodiments disclosed herein are illustrative of the principles of the invention only. Many other structural modifications may be devised by those skilled in the art without departing from the spirit and scope of the invention.

What is claimed is:

1. In a device for removing particulate matter from a gaseous medium, the combination comprising:
    a first member for accelerating a gaseous medium flowing into said device; and
    diverting means for diverting the flow of said medium, said diverting means including a second member having a plurality of parallel apertures expandable in response to pressure exerted on said second member by said accelerated gaseous medium.

2. A device in accordance with claim 1 wherein said first member is perforated with a plurality of holes and the apertures in said second member comprise slits interspersed between said holes.

3. A device in accordance with claim 1 wherein said second member comprises a plurality of adjacent hills and valleys, said hills abutting said first member and said apertures opening through said valleys.

4. A device in accordance with claim 3 wherein said second member is made of metal foil.

5. In a device for conducting a gaseous medium laden with moist particulate matter, the combination comprising:
    a first member for accelerating a gaseous medium flowing into said device, said first member being thin, flat, perforated with a plurality of holes and disposed with said holes aligned to intercept said medium as it flows in said device; and
    a second member for diverting the flow of the accelerated medium, said second member being made from a flexible material perforated with a plurality of parallel slits, being disposed in face to face relationship with said first member and being oriented with the slits therein offset from the alignment of said holes whereby the medium which is accelerated by said first member and which enters the slits in said second member is compelled to negotiate a change of flow direction and moist particulate matter carried by said medium and unable to negotiate a change of flow direction is intercepted and removed from said medium by splattering on said second member.

6. A device in accordance with claim 5 wherein said holes are disposed in parallel rows and said slits are interspersed between said rows.

7. In a device for removing particulate matter from a gaseous medium wherein the particulate matter is removed by diverting the flow of said gaseous medium through expandable apertures and the efficiency of matter removal is controlled by the amount said apertures expand, the combination comprising:
    a first member for accelerating a gaseous medium flowing in said device; and
    a second member for diverting the flow of said medium when accelerated by said first member, said second member including a plurality of apertures expandable in response to pressure exerted on said second member by said accelerated medium and control means for regulating the extent said apertures expand in response to the pressure exerted on said second member by said medium whereby the size of said apertures is controlled.

8. A device in accordance with claim 7 wherein said second member abuts said first member and said control means includes a third member having a plurality of apertures expandable in response to pressure exerted on said member by accelerated smoke and gas.

9. A device in accordance with claim 8 wherein said control means is in close proximity to said second member, said apertures in said second member comprise a plurality of slits arranged in parallel with each other, and said apertures in said control means comprise a plurality of slits arranged in parallel with each other but not in parallel with the slits in said second member.

10. A device in accordance with claim 9 wherein the number of slits in said second member differs from the number of slits in said control means.

11. In a device for removing particulate matter from a gaseous medium wherein the particulate matter is removed by diverting the flow of said medium through filter passages and the efficiency of matter removal is controlled by the size of said filter passages, the combination comprising:
    a first member for accelerating a gaseous medium flowing in said device;
    a second member for diverting the flow of the medium accelerated by said first member, said second member facing said first member and including a plurality of parallel flexible strips for opening filter passages through said second member in response to pressure exerted on said strips by said accelerated medium; and
    a third member for regulating the extent strips in said second member respond to pressure exerted thereon by said accelerated medium, said third member including a plurality of parallel flexible strips for opening filter passages through said third member in response to pressure exerted thereon from said accelerated medium, said third member being disposed face to face in close proximity to said second member and oriented with the flexible strips therein out of alignment with the flexible strips in said second member.

12. A device in accordance with claim 11 wherein the number of flexible slits in one of said second and third members exceeds the number of flexible strips in the other member.

13. In a device for removing particulate matter from a gaseous medium, the combination comprising:
    a first member for accelerating a gaseous medium flowing into said device; and
    a second member for diverting the flow of the accelerated medium, said second member facing said first member and including a plurality of flexible strips for opening filter passages through said second member in response to pressure exerted thereon by said accelerated medium.

References Cited

UNITED STATES PATENTS

| | | | |
|---|---|---|---|
| 2,224,588 | 12/1940 | Bluhm | 131—11 |
| 3,054,410 | 9/1962 | Gould | 131—10.3 |
| 3,079,926 | 3/1963 | Litchfield | 131—10.5 |
| 3,269,394 | 8/1966 | Curtis | 131—210 |
| 3,318,312 | 5/1967 | Curtis | 131—10.5 |

FOREIGN PATENTS 669,684  12/1938  Germany.

LUCIE H. LAUDENSLAGER, *Primary Examiner.*